United States Patent Office 3,819,610
Patented June 25, 1974

3,819,610
PROCESS FOR PREPARING POLYCELLULAR PROTEIN PRODUCTS
Cavit Akin, Oakbrook, Ill., assignor to
Standard Oil Company, Chicago, Ill.
No Drawing. Filed Oct. 29, 1970, Ser. No. 85,268
Int. Cl. D01f 9/04
U.S. Cl. 264—202                    5 Claims

ABSTRACT OF THE DISCLOSURE

Protein-containing single cell micro-organism are chemically prepared into a product, having sufficient intercellular bonds formed between individual cells to render the product non-dispersible in water, by a process in which certain functional groups in the individual cell walls, such as hydroxide groups, amine groups, and —S—S— groups, are first chemically activated and then induced to form intercellular bonds with the cells walls of adjacent cells. The protein product prepared by the process is suitable for use as an additive to or substitute for natural foods. The protein products prepared by the process are also suitable, for example, in the preparation of biodegradable containers, packing materials, and utensils.

BACKGROUND OF THE INVENTION

This invention relates generally to protein-containing single cell micro-organisms, and more particularly, to a process for chemically preparing a protein product having intercellular bonds formed between individual cells in a manner sufficient to render such products useful as additives to or substitutes for conventional foods. Protein products so prepared are also useful in the production of biodegradable and edible packaging materials, containers, utensils, and the like.

Much attention has recently been directed toward the development of new sources of protein suitable for human consumption. Population increases, for example, have made the continued dependence on traditional sources of protein highly impractical. In addition, the supply of protein provided by such typical protein sources as animal meat and vegetable has proved inadequate to meet the dietary needs of humans throughout the world.

One solution to the problem of satisfying these increased needs for food protein is provided by processes for the biosynthetic production of protein through the growth of microorganisms on hydrocarbon or other substrates. It is known, for example, that micro-organisms, such as bacteria and yeasts, which are grown by single-cell reproduction, contain high proportions of proteins and can be utilized directly in foods as a whole cell material or can be treated to recover protein isolates. Recent efforts have shown that micro-organisms, grown on hydrocarbon substrates, can be successfully utilized in animal feeds; but as yet, these micro-organisms have not been commercially accepted in food preparations suitable for human consumption.

Typical of the bio-synthetic processes for cultivating micro-organisms, such as yeast, moulds and bacteria, is the process described in U.S. Pat. No. 3,271,266 where microorganisms are grown in the presence of a petroleum fraction containing straight chain hydrocarbons, an aqueous nutrient medium and a gas containing free oxygen. Other suitable processes for the bio-synthetic production of micro-organisms include the cultivation processes described in U.S. Pats. Nos. 3,268,413 and 3,384,491.

One reason for the commercial unsuitability of bio-synthetic protein-containing micro-organisms (sometimes referred to herein as single cell proteins or microbial cells) is the lack of texture inherent in such products. Generally, single cell protein is initially produced as a wet paste and then subsequently converted into dry powder form. This dry powder, similar in appearance and feel to flour, lacks the texture and food-like sensation to the mouth necessary to make it an attractive food product. Moreover, when placed in water, the powdered single cell protein becomes rapidly dispersed into the single cell form.

This observed inability to form a rigid or flexible, texturized structure from single cell protein is further complicated by its extremely small size of the individual protein-containing cells. The single-cell protein materials have individual cell sizes within the range of 0.2 to 10 microns. By necessity, therefore, the problem of texturizing single-cell protein products is not solved by merely applying the known solubilization-desolventation protein techniques, but rather significantly new processes, which involve inter-particle reactions, are required to accomplish texture formation in single cell protein.

SUMMARY OF THE INVENTION

According to this invention, a process is provided for chemically treating single-cell protein materials, e.g., microbial cells, in a manner sufficient to impart desirable textural properties to the cell material. In general, a process is provided for chemically preparing polycellular products from a plurality of individual protein-containing microbial cells. The polycellular products prepared by the process have sufficient intercellular bonds formed between individual cells to resist dispersion of the product back into individual cells.

One embodiment of the process involves the activation of hydroxide functional groups contained in the cell walls by treating the cells with a hydroxide-containing base and then adding either carbon disulfide or carbonyl sulfide to the mixture of the base and individual cells. The formation of intercellular bonds between the cell walls is induced by passing the activated cells through an acid bath.

In another embodiment of the process, disulfide,

—S—S— functional groups contained in the cell walls are first activated by treatment with an organic reducing agent and then inducing the formation of intercellular bonds by exposing the activated cells to an oxidizing agent.

In yet another embodiment of the process of this invention, hydroxide and amine functional groups contained in the cell walls are both activated and induced to form intercellular bond by treatment with a bifunctional cross-linking agent for the hydroxide and amine groups in the presence of an acid or base.

The polycellular products formed by the process of this invention have the highly desirable properties of chewiness, crispness, and ability to resist dispersion in water. This latter characteristic is particularly meaningful since the primary drawback of single cell protein materials, namely, the reversion back into individual single cells when placed in water, has been entirely eliminated by the process of this invention and in the products produced therefrom.

The polycellular products of this invention, moreover, can be readily shaped into a variety of fibrous forms or the like and can simulate to a remarkable extent the chewiness, moistness and texture of cooked meats, both in mouth feel and appearance. In addition, the polycellular products of this invention can be made into highly porous texturized structures capable of fat and water absorption. Furthermore, the polycellular products of this invention can be produced in the form of films of various thicknesses, or they can be formed in any other desired shape. The products so obtained are edible and biodegradable.

Accordingly, the practice of this invention results in the preparation of single-cell protein products having the requisite physical properties for use as an additive to or substitute for conventional foods. Moreover, texturization can now be accomplished chemically for previously untexturizable single-cell protein materials with a minimum of complex and expensive equipment.

DESCRIPTION OF THE PREFERRED EMBODIMENTS

Before proceeding with a more detailed discussion of the various embodiments of this invention, an explanation is set forth of the usage and meaning of certain terms which have been relied on in defining the invention.

The term "texture" for example, is used herein to refer to a rigid mass, or flexible mass, of individual cells which can be readily formed into various sizes, shapes and configurations and which is non-dispersible in water.

The term "polycellular" as used herein refers to the interconnected cellular state of a plurality of individual microbial cells wherein a sufficient number of intercellular bonds are formed between individual cells to cause a resistance in the ability of the combined mass of cells to revert back into individual cells. In this sense, polycellularization is analogous to polymerization on the molecular scale.

The term "shaping" as used herein refers to and includes any physical operation, such as slicing, chopping, extruding, pressing, molding, or the like, which causes either activated cells or polycellular products to conform to a particular configuration.

The term "chewiness" refers to a particular physical state of the polycellular protein products of this invention which causes such products when chewed in the mouth to have the physical properties of resilience, elasticity and resistance to shear.

Turning now to the various embodiments of this invention, it should be noted that the process of this invention concerns a technique for chemically preparing a polycellular product from a plurality of individual protein-containing microbial cells by: (a) activating certain functional groups contained in the cell walls of the individual cells and (b) inducing the formation of intercellular bonds between the cell walls of individual cells.

The process of this invention is especially designed to provide a method for imparting texture characteristics and properties to protein-containing micro-organisms grown by known commercial fermentation processes. In various embodiments of this invention, the cell harvest from a commercial fermentor, as for example the crude, moisture-containing product cake recovered from a centrifuge or filter, serves as a suitable starting material for the process.

Any microbial cell materials, however, can be treated according to the process of this invention. In a fully integrated, continuous system, the microbial cells are conveniently grown in a first fermentation stage where oxygen and a suitable substrate such as liquid or gaseous hydrocarbons or oxygen containing derivatives of hydrocarbons or carbohydrates together with a nutrient solution containing vitamins and minerals are fed to a stirred reactor containing micro-organisms. The growth rate of micro-organisms on the hydrocarbon or other substrate is typically exponential. As the micro-organism concentration increases, a portion of the reaction mixture is withdrawn from the stirred reactor and the micro-organisms separated from the withdrawn reaction mixture. Included among the various processes suitable for preparing starting materials used in the practice of this invention are the processes described in U.S. Pats. Nos. 3,384,491; 3,271,266; and 3,268,413.

By way of illustration, bacteria such as those listed in Table I, yeasts such as those listed in Table II, and fungi such as those listed in Table III are suitable micro-organisms for use as starting materials in the practice of this invention.

TABLE I.—SUITABLE BACTERIA

| | |
|---|---|
| Acetobacter sp. | Corynebacteria sp. |
| Arthrobacter sp. | Micrococcus sp. |
| Bacillus subtilus | Pseudomonas sp. |

TABLE II.—SUITABLE YEASTS

| | |
|---|---|
| Candida curvata | Saccharomyces fragilis |
| Candida lipolytica | Trichosporon cutaneum |
| Candida pulcherima | Saccharomyces cerevisiae |
| Candida utilis | Candida parapsilosis |
| Hansenula anomala | Hansenula wickerhamii |
| Hansenula miso | Pichia pastoris |
| Oidium lactis | Pichia haplophyla |
| Saccharomyces carlbergensis | |

TABLE III.—SUITABLE FUNGI

| | |
|---|---|
| A. niger | A. itaconicus |
| A. glaucus | P. notatum |
| A. oryzae | P. chrysogenum |
| A. flavus | P. glaucum |
| A. terreus | P. griseofulvum |

The use of Candida utilis, Saccharomyces cerevisiae, Saccharomyces fragilis, and Saccharomyces carlsbergensis are preferred starting materials for the process of this invention, however, because each is F.D.A. approved for use in food products.

It has been observed that the cell walls of microbial cells, such as yeast and bacteria, contain polysaccharides as basic structural components, (e.g., glucans and mannans on yeast cell walls and polyglucosamine on bacterial cell walls). Also included in the cell wall structure are varying amounts of proteins, lipids, and minerals. Basically, however, it has been determined that cell walls contain at least the following functional groups:

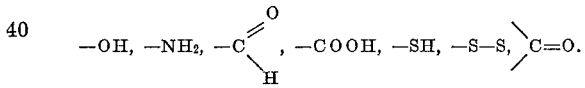

The process of this invention, therefore, is based in part upon the recognition of the fact that certain of these functional groups contained in the cell walls can be chemically treated to cause intercellular bond formation with other functional groups in other cell walls. In this way, a highly cross-linked, polycellular product can be prepared from a plurality of individual microbial cells.

In each of the embodiments of this invention, the single cells are typically in the form of an aqueous slurry or paste prior to treatment. The aqueous slurry of single cell protein materials obtained from fermentation, for example, normally has a cell concentration in the range of about 1 to 2 percent by dry weight of the cells based on the total weight of the slurry. Accordingly, it is desirable to concentrate the aqueous slurry or paste prior to undertaking the other steps involved in the polycellularization process. Concentration can be accomplished by means such as centrifuging, drying, and the like to obtain a suitable cell concentration.

It has been found that cell concentrations in the range of about 5 to 30 percent by dry weight of the cells based on the total weight of the cell slurry or paste are desirable for use in the process of this invention. Preferably, however, cell concentrations in the range of 10 to 15 percent by dry weight of the cells based on total weight of the cell slurry or paste are employed because such concentrations strike an excellent balance between the flow characteristics of the paste or slurry and the degree of closeness between cell walls required to cause effective intercellular bond formation.

After adjusting cell concentration, certain specific functional groups in the cell walls are activated by chemical treatment. Further treatment of the cells results in intercellular bond formation. The various embodiments of the invention are discussed herein in accordance with the specific functional groups contained in the cell walls which are activated and induced to form intercellular bonds.

In one embodiment of the invention, hydroxide functional groups, e.g., —OH, contained in the cell walls of individual protein-containing cells are activated in two stages. First, the concentrated aqueous paste of individual cells is mixed with a solid or concentrated solution of a hydroxide-containing base, such as an alkali metal hydroxide or ammonium hydroxide. Normally, sufficient base is added to the aqueous paste to yield a finel concentration of base in the aqueous paste-base mixture of about 1 to 10 percent by weight base. Alternatively, sufficient base can be added to the aqueous paste to adjust the pH of the resultant mixture to about 7.5 to 10.5. Secondly, the alkaline paste is mixed with a compound selected from the group consisting of carbonyl sulfide (COS) and carbon disulfide ($CS_2$). This second stage of the activation step can be carried out, for example, by bubbling the carbon disulfide or carbonyl sulfide through the alkaline paste or slurry. Although the second stage addition of carbon disulfide or carbonyl sulfide can be carried out at room temperature, it is desirable in terms of final product properties to make the addition at elevated temperatures of about 90 to 100° C. In an alternate process, temperatures as low as about 0° C. to 20° C. are used.

Although various alkali metal hydroxides are suitable for use in the first stage of the activation step, sodium and potassium hydroxide are preferred because of their low cost and ready availability; similarly, ammonium hydroxide is used in place of alkali metal hydroxide. The effect of treating the cells with a hydroxide-containing base is to activate hydroxide functional groups in the cell walls.

After cell activation, the alkaline paste or slurry is shaped in an extruder or the like and then passed into an acid bath. The particular shape of the cell slurry or paste emitted from the extruder determines the shape of the ultimate product formed by the process. In addition, subjecting the activated cells to the acid bath causes the cell wall components to be deactivated. By maintaining the individual cells in a relatively close relationship during deactivation, intercellular bonds are formed between the individual cells.

Normally, isopropanol, ethanol, or the like, is added to the acid bath in order to keep cell wall active sites away from possible reaction with water molecules and to insure a high degree of intercellular bond formation. Among the acids suitable for use in the acid bath are phosphoric acid, citric acid, acetic acid, and lactic acid. Other acids usually employed in food product technology are also suitable for use in the acid bath.

Since $CO_2$ and $H_2S$ gases are released during the treatment process, the final polycellular product formed has a slightly porous structure which makes it particularly suitable for absorbing fats and water.

In a second embodiment of this invention, cell wall activation is directed toward disulfide, —S—S—, functional groups contained in the cell walls. The activation of disulfide functional groups in the cell walls is effected by treating a concentrated cell slurry with an organic reducing agent. Normally, this treatment is carried out in a reactor in which cell slurry and reducing agent are mixed. Then the activated slurry of cells is shaped in an extruder or the like and passed into an oxidation zone where intercellular bond formation takes place between individual cell walls. Finally, the polycellular product obtained from the process is dried and then collected.

More specifically, the preferred organic reducing agents used in the activation step are sodium thioglycollate and glutathione. These specific reducing agents are preferred in the practice of this invention because they are F.D.A. approved for use in food products. Included among the oxidizing agents employed in the intercullar bond formation step are air, oxygen, ozone, hydrogen peroxide and sodium bromate. When hydrogen peroxide is used as an oxidizing agent, $O_2$ gas released during the treatment process results in the formation of a highly porous final polycellular product.

Although the invention is no way limited to its theory of operation, it should nonetheless be pointed out that it is believed that —S—S— bonds contained in the microbial wells control the secondary structure of protein molecules in the cell walls. This secondary structure of the protein molecules, in turn, controls the basic three dimensional structure of the protein molecules as compared with the primary structure controlling the sequence of amino acids in the molecule. Accordingly, activation of the —S—S— functional group, with an organic reducing agent acts to cleave the —S—S— bonds to form —S—H bonds in the individual cell walls. Cleavage of the —S—S— bonds disrupts the secondary structure of the protein molecules. When the protein with —S—H bonds is oxidized with a suitable oxidizing agent, new —S—S— bonds are formed but not necessarily at the previous sites of the original —S—S— bonds. In fact, by controlling the distance between individual cell walls in the cell slurry, the new —S—S— bonds can be made to preferentially form between two individual cell walls. In this way, an entirely new highly cross-linked, polycellular cell mass can be formed from a slurry of previously individual microbial cells.

In a third embodiment of the invention, —OH and —$NH_2$ functional groups contained in the cell walls are first activated and then induced to form intercellular bonds. Activation and cross-linking of the —OH and —$NH_2$ groups are made to occur in a single step by treating an aqueous paste of microbial cells with a bifunctional cross-linking agent for —OH and —$NH_2$ groups in the presence of an acid.

Specifically, a concentrated aqueous paste of microbial cells is first mixed with a suitable bifunctional cross-linking agent, such as formaldehyde or glutaraldehyde. Then, the mixture is added to a concentrated acid solution, such as hydrochloric acid, shaped by means of extrusion or the like, and permitted to dry at about 30° C. to 40° C. under vacuum or under a current of air. Alternatively, however, the activated microbial cells, after treatment with formaldehyde, glutaraldehyde, or some other bifunctional cross-linking agent can be treated with a base such as ammonia or sodium carbonate to cause intercellular bond formation. In addition, the microbial cells can first be mixed with acid or base and then subsequently treated with formaldehyde or glutaraldehyde to form a polycellular product. Although intercellular bond formation can occur with a number of bifunctional cross-linking agents, it has been found that particularly suitable polycellular products are prepared when a 2 percent by weight aqueous solution of formaldehyde is employed in the process.

All of the unique products prepared by the processes embodied in this invention are characterized by having sufficient intercellular bonds formed between individual microbial cells to render the polycellular product so formed non-dispersible in water. When viewed under a microscope, for example, products of this invention have a highly rigid cross-linked structure in which a plurality of individual microbial cells are physically attached into a composite mass. Such polycellular products are useful in a wide range of food products and food intermediates, such as high protein snack products, simulated meat products and bakery products.

The processes and products of this invention are illustrated in the following examples. All parts and percentages are by weight unless otherwise indicated.

EXAMPLE I

One gram spray dried commercial Torula yeast was mixed with 5 ml. water and 0.1 ml. concentrated hydrochloric acid. Formalin (0.2 ml.) was added to the paste and the paste was formed into a 2 mm. thick layer and allowed to dry in air at room temperature for 48 hours. A tough, solid mass was obtained. The mass had a "polmerized" cell structure. Shavings obtained from the "cell polymer" indicated a close surface contact of the cells when examined under microscope. The mass was difficult to break. No dispersion to single cells took place when the solid mass was soaked in water. After two years of storage under water at 3° C., the mass was still solid. The sample which was soaked in water under non-sterile conditions developed a mold growth after 4 months of storage at 3° C. The mold growth indicates the potential biodegradability of such a product. Then, the advantage of such a process is that it produces a plastic-like polycellular textured product which is biodegradable.

EXAMPLE II

*Candida utilis* paste (23%) grown in laboratory fermentors was mixed with formaldehyde (yeast dry weight/formaldehyde ratio 20/1). The mixture was extruded through a syringe to form a 1 mm. diameter fiber. The extrudate was kept in a closed jar which was saturated with HCl gas. The jar was opened after two days. The fiber was allowed to dry in air. The dry fiber was brittle. When shavings of the fiber were soaked in water under microscope, they absorbed water and expanded in diameter. The expansion caused formation of radial cracks but no single cell dispersion took place. This experiment was conducted at room temperature and under atmospheric pressure. One advantage of this process is that it produces fibers which absorb water and expand. Both the water holding capacity and expansion in water are desired functional characteristics in some food and feed applications.

EXAMPLE III

*Candida utilis* paste of 15% dry weight was mixed with formalin to obtain a 0.3% formaldehyde concentration in cell paste on volume/volume basis. The cells + formalin paste was then mixed with concentrated HCl at 0.2% (v.v.) level at room temperature. The mixture was extruded to form 1 mm. thick fibers. The extrudate was dried under 500 mm. vacuum at 40° C. The dry product was brittle. It did not disperse into single cells when soaked in water. A control which was prepared by drying a 15% cell paste fiber under similar conditions, dispersed into single cells as soon as it was soaked in water.

EXAMPLE IV

*Candida utilis* paste was washed in ethanol and partially dried to form a fluffy mass (about 30% dry weight). The cell mass was then exposed to HCl and formaldehyde vapors overnight at room temperature. The product then was dried under air current. Dry product retained its fluffy character, but it did not disperse into single cells when soaked in water. One advantage of this process was in its simplicity in preparing a textured single cell protein product.

EXAMPLE V

Same test (Example IV) was repeated with commercial baker's yeast paste. The polymerized cell mass was obtained as witnessed by the lack of dispersion into single cells when soaked in water.

EXAMPLE VI

The same experiment (Example IV) was repeated with fluffy yeast paste prepared with spray dried brewer's yeast. The final product was not dispersed into single cells in water.

EXAMPLE VII 3 g. of dry butane grown bacterial mass was mixed with 10 ml. 1 n HCl to form a paste. The paste was formed into 2 mm. thick plates and the plates were soaked in formalin solution overnight at 25° C. The cell mass was flaky after 24 hours. Excess formalin was decanted. The residue was washed with water by centrifugation until no formaldehyde smell could be detected. The product was dried in air to a flaky mass at room temperature. It could absorb four times of its mass in water without dripping. In excess water addition, no dispersion to single cells could be observed. One advantage of this process is that it produces a texture with relatively high water holding and fat retension capacities.

EXAMPLE VIII 3 g. Torula yeast was formed into a paste by mixing in 1 n HCl which contained 10% Glycerol. The paste was then formed into 1 mm. diameter fibers by extruding through as syringe and, exposed to formaldehyde vapors at room temperature in a closed jar, for about 48 hours. The fibers then were dried under vacuum at 30° C. Dry fibers retained their form when soaked in water. One advantage of this process is that flexible fibers could be obtained.

EXAMPLE IX 10 g. bakers' yeast paste was suspending in 10 ml. 1% $Na_2CO_3$ solution in water kept at 80° F. for three hours, centrifuged, to obtain a paste. The paste was suspended in 3% formaldehyde solution and kept 30 minutes at 80° F. The suspension was centrifuged to form a paste. The paste was extruded through a syringe to form 1.0 mm. diameter fiber. The fiber was soaked in 3% formaldehyde solution in 1% $Na_2CO_3$ in water and kept overnight at 70° F. The solution was decanted and the fiber was air dried. The fiber expanded in water but it did not disperse into single cells.

EXAMPLE X

The pH of 2% Torula yeast suspension from a fermentor was brought to 8 by adding ammonia. One hundred ml. of pH 8 cell suspension was added to 2 ml. of formalin. The mixture was held at room temperature for 30 minutes, then centrifuged. The residual paste was formed in 1 mm. thick film on an aluminum foil and dried at 80° C. The dry film did not disperse in water.

EXAMPLE XI

Spray dried *Saccharomyces carlsbergensis* (Browers' Yeast) was suspended in 2% $NaHCO_3$ solution in water to form a 10% slurry. The slurry was kept at 100° F. for two hours, then centrifuged. The residual paste was suspended in 5% formaldehyde solution and kept at 100° F. for four hours and the cells were allowed to settle overnight. The clear supernatent then was decanted. The residue was washed twice with 1% $Na_2CO_3$ solution in water and the final residue was dried in air. The dry mass formed flakes but did not disperse into single cells in distilled water. One advantage of this process is that flakes of single cell protein are obtained.

EXAMPLE XII 1 g. spray dried Torula yeast was suspended in 10 ml. 10% formaldehyde solution. The mixture was autoclaved in a sealed vial at 14.5 p.s.i. at 121° C. for 20 minutes. The sample then was dried under vacuum, washed with 1 M $Na_2CO_3$ solution and then with water. Finally, the sample was dried under vacuum again. The dry substance did not disperse into single cells when placed in water.

EXAMPLE XIII 1.0 g. spray dried Torula yeast was mixed with 1.0 ml. 10% formaldehyde in a mortar. The mixture was pressed into a 2 mm. thick film in a glass petri dish and left to dry in air. The dry product was not dispersed into single cells when soaked in water.

EXAMPLE XIV

Torula yeast, fresh from a fermentor, was concentrated to 20% dry weight level by centrifugation. The paste was heated to 70° C. until it collapsed to a flowing mass. 1 ml. concentrated HCl and 2 ml. formalin was added to 100 ml. slurry at 70° C.; mixed well and left at room temperature to dry. The dry mass was strong to break, also it was resistant to dispersion in water.

EXAMPLE XV 10 g. fresh Torula yeast paste (20% dry weight) was mixed with 0.1 g. sodium lauryl sulfate and 0.2 g. NaOH to form a viscous mixture. To this 1 ml. formalin was added and the mixture was allowed to dry under vacuum. The dry product was not dispersible to single cells when soaked in water.

EXAMPLE XVI 1 g. cell paste (10% dry weight) was frozen and freeze dried. The dry product was heated at 200° C. for two minutes then cooled and dipped in formalin solution for two minutes, then taken out, allowed to drain and dry at room temperature. The dry product was spongy in character and rather flexible. The dry product could not be dispersed in water. One advantage of this process is that a flexible, spongy texture can be obtained.

EXAMPLE XVII

A 10 ml. suspension of 10% dry weight butane culture cells was mixed with 1 ml. of a 10% solution of KOH and the mixture was boiled for 15 minutes. The alkali treated suspension was then cooled and centrifuged. The residue was resuspended in 1% KOH solution in water at room temperature. The suspension was centrifuged again and the residue was washed once more with 1% KOH solution. The residue was suspended in 10 ml. percent KOH solution and about 100 ml. carbonyl sulfide gas was bubbled through the suspension within 5 minutes at room temperature under atmospheric pressure. The mixture was centrifuged and the residue was allowed to dry to form a thin film on a glass dish at room temperature overnight. The dry product was translucent and brittle; when soaked in water it flaked but it did not disperse into single cells. One advantage of this process was that a translucent film could be obtained.

EXAMPLE XVIII

Example XVII was repeated except that the film was first exposed to HCl vapors for about 15 minutes in a concentrated hydrochloric acid desiccator at room temperature and then dried in air at room temperature. The films so obtained were slightly opaque. They did not disperse into single cells when soaked in water. One advantage of this process was that the films so obtained were microporous due to slow $H_2S$ and $CO_2$ release, and they absorbed about 3 times their weight in water and in oil.

EXAMPLE XIX

The process in Example XVIII was repeated except that carbonyl sulfide was bubbled through the cell suspension while the suspension temperature was about 90° C.–100° C. The film obtained with this process had no dispersion of single cells in water. One advantage of this process was that the carbonyl sulfide bubbling time could be reduced to 5 minutes as compared to 15 minutes or more using the room temperature process.

EXAMPLE XX 10 g. Torula yeast paste, which contained about 20% yeast cells on a dry weight basis, was mixed with 0.2 ml. 1% NaOH solution in water at room temperature. Carbon disulfide (0.2 ml.) was added to the alkaline paste and the mixture was allowed to stand overnight at 3° C. The viscous product so obtained was spread over a glass dish to form a layer of about 0.5 mm. thick and dried under a current of air at 25–35° C. The film so obtained was almost transparent and it did not disperse into single cells when soaked in water.

EXAMPLE XXI

The procedure in Example XX was repeated except that the final viscous paste was extruded through a syringe into a pH 4.5 phosphoric acid bath to form fibers of about 0.3 mm. diameter. The fibers were dried in a 40° C. vacuum oven overnight. The dry fibers were writtel but they absorbed three to four times their weight in water and did not disperse into single cells.

EXAMPLE XXII 10 g. spray dried Brewers' yeast was dispersed in 100 ml. 1% NaOH solution in water at about 25° C. The mixture was allowed to stand at 25° C. for 30 minutes then it was centrifuged. The supernatant was discarded and the residual alkaline paste was put into a three-neck round-bottom flask which was dipped in a cold bath of about −5° C. to 5° C. The flask was equipped with a Dry-Ice acetone condensor. First the condenser was exposed to carbonyl sulfide gas until about 2 grams of carbon sulfide became condensed. Then the condenser was inserted into the three-neck round-bottom flask which contained the alkaline paste and the carbonyl sulfide was allowed to evaporate and to be absorbed by the viscous paste during a period of 30 minutes. The product was allowed to stand 15 minutes more at about −5° to 5° C. Then, the viscous dope was spread over a glass plate as an 0.4 mm. thick film and dried in a 50° C. oven overnight. The film so obtained was yellow colored and transparent. It was about 0.1 mm. thick. It did not disperse into single cells when soaked in water. One advantage of this process was that the films so obtained were transparent.

EXAMPLE XXIII

The procedure in Example XXII was repeated except that the viscous dope was extruded through a syringe to a pH 4.5 citric acid bath to form fibers of about 0.2–0.5 mm. diameter. The fibers were recovered from the acid bath, dried at 60° C. The dry fibers did not disperse into single cells in water. One advantage of this procedure was that fibers with micropores were obtained. The fibers were slightly opaque and they could absorb the water equivalent to three to four times their weight.

EXAMPLE XXIV

One gram of spray dried Brewers' yeast was suspended in 10 ml. of 0.1% sodium thioglycollate solution in water at room temperature. The mixture was centrifuged and the residue, which contained about 20% cells, was extruded through a syringe to form fibers of about 0.3 to 0.6 mm. diameter. The fibers were dried under an air current at room temperature. The dry fibers were brittle; they absorbed water equivalent to two to four times their weight and expanded, and no dispersion into single cells occurred when the fibers were soaked in water.

EXAMPLE XXV

A ten gram fresh *Candida utilis* paste sample of 25% dry weight was mixed with 0.01 gram sodium thioglycollate in a kitchen mixer at room temperature. The mixture was separated over a glass plate as a thin film. About 1 ml. of 3% hydrogen peroxide was sprinkled over the film. Hydrogen peroxide decomposed by the cell peroxidase enzyme as it penetrated the cell layers. A foamy cell layer was formed and then dried at 70° C. in an oven. The product was a porous cell film. When the film was soaked in water it absorbed water at an equivalent amount of three to four times its weight. There was no dispersion in water into single cells. One advantage of this procedure is in the usage of the existing peroxidase system in fresh cells to produce a porous textured product.

EXAMPLE XXVI

A ten gram Torula yeast paste sample of 20% dry weight was mixed with 0.01 gram glutathione in a kitchen mixer at room temperature. The mixture was put in a 100 ml. 0.1% sodium bromate solution and stirred gently for 5 minutes. The slurry was allowed to settle and the supernatant was discarded. The residue was suspended by gentle agitation in 80 percent by weight Ethanol and allowed to settle. The supernatant was decanted and the residue was poured in a glass dish and dried at 70° C. oven. A flaky product was obtained. The product absorbed water two to four times its weight and it retained oil in as much as two to five times its weight. It did not disperse into single cells in water. One advantage of this procedure is that it gives a flaky product was good functionality.

EXAMPLE XXVII

One gram of spray dried Torula yeast was mixed with 4 ml. of 0.1% sodium thioglycollate in a kitchen mixer at room temperature. The mixture was extruded or rolled and chipped in various forms and put in a desiccator which contained $CaCl_2$ as the drying agent. The desiccator was evacuated first, and then it was filled with oxygen. The desiccator was kept at a 30° C. room temperature and the dry products were taken out after 48 hours. The dry products retained their shape in water although they became soft. In an alternate procedure they were toasted by heating at 150 to 350° C. for 2 to 5 minutes. After they were taken out of the desiccator, the toasted products had a pleasant aroma and a crunchy mouth feel.

EXAMPLE XXVIII

About 10 g. fresh *Candida utilis* paste (about 20–25% dry weight) was mixed with about 0.3 g. Glutaraldehyde and the mixture was spread over a glass plate to form a 0.5 to 1 mm. thick layer. Then the cell layer was sprinkled with about 1 ml. concentrated HCl by using an atomizer, and dried at room temperature. The dry product was a translucent film. It had a brittle texture; it became soft in water but did not disperse into single cells.

EXAMPLE XXIX

The dry film, which was obtained as described in Example XXVIII, was soaked in n 8% Glycerol solution in water for 15 minutes. Then it was dried at 50° C. under vacuum. The dry product was flexible. It did not disperse into single cells in water.

It should be understood that various changes and modifications of the specific embodiments disclosed herein can be made without departing from the spirit and scope of this invention as defined by the following claims.

I claim:
1. A process for preparing a polycellular, texturized protein product from a plurality of individual protein-contining microbial cells, said product being substantially non-dispersible in water, comprising the steps of:
 (a) preparing an aqueous paste of individual microbial cells, having a cell concentartion of from about 5 to about 30 wt. percent;
 (b) adding to said paste, with mixing, a first treating agent, reactive with functional groups contained in the cell walls of said individual microbial cells, consisting of a hydroxide-containing base selected from the group consisting of ammonium hydroxide, sodium hydroxide and potassium hydroxide, in an amount sufficient to provide a pH value in the paste within the range from about 7.5 to about 10.5, together with carbonyl sulfide or carbon disulfide;
 (c) contacting the treated paste with a second treating agent, capabel of inducing the formation of intercellular bonds involving said functional groups contained in the cell walls, consisting of an acid selected from the group consisting of hydrochloric acid, phosphoric acid, citric acid, acetic acid, and lactic acid, in an amount sufficient to lower the pH value of the paste to about 4.5; and
 (d) extruding said paste.

2. The process of claim 1 wherein hydroxide functional groups contained in the cell walls of said individual protein-containing microbial cells are activated by first treating said individual cells with a hydroxide-containing base in sufficient amount to provide in the aqueous paste a pH value from about 7.5 to about 10.5, and adding to the alkaline aqueous paste an activating amount of carbonyl sulfide or carbon disulfide.

3. The process of claim 2 wherein the treated cells are subsequently treated with an acid by passing said treated cells through an acid bath.

4. The process of claim 3 wherein said portein-containing microbial cells are selected from the group consisting of *Candida utilis, Saccharomyces carlsbergensis, Saccharomyces cerevisiae*, and *Saccharomyces fragilis*.

5. The process of claim 3 wherein said activated cells are first shaped into fibrous form prior to being passed through said acid bath, whereby a fibrous polycellular product is formed from said plurality of individual microbial cells.

References Cited

UNITED STATES PATENTS

| | | | |
|---|---|---|---|
| 2,541,803 | 2/1951 | Wormell | 264—202 |
| 3,177,079 | 4/1965 | Kuramoto et al. | 99—14 |
| 3,171,831 | 3/1965 | Town | 260—112 R |
| 3,239,501 | 3/1966 | Stankovics et al. | 195—28 R |
| 3,268,412 | 8/1966 | Champagnat et al. | 99—14 |
| 3,347,688 | 10/1967 | Frankenfeld et al. | 195—3 H |
| 3,356,518 | 12/1967 | Gilboe et al. | 260—112 R |
| 3,394,015 | 7/1968 | Giacino | 260—112 R |
| 3,468,669 | 9/1969 | Boger et al. | 99—17 |
| 3,585,179 | 6/1971 | Samejima et al. | 260—112 R |
| 3,607,293 | 9/1971 | Furakwa et al. | 99—1 |
| 3,615,654 | 10/1971 | Ayukawa | 299—1 |
| 3,493,386 | 2/1970 | Pyne | 99—17 |
| 3,496,858 | 2/1970 | Jenkins | 99—17 |
| 3,645,746 | 2/1972 | Akinson | 99—17 |
| 3,662,671 | 5/1972 | Fredelsen et al. | 99—17 |
| 3,662,672 | 5/1972 | Hoer | 99—17 |

OTHER REFERENCES

"Textbook of Biochemistry," by Staunton et al., pp. 342–346. Fourth Ed. 1969, Macmillan Co., N.Y.

JAY H. WOO, Primary Examiner

U.S. Cl. X.R.

106—124; 195—28 R; 260—112 R; 426—204, 364

PO-1050
(5/69)

UNITED STATES PATENT OFFICE
CERTIFICATE OF CORRECTION

Patent No. 3,819,610      Dated June 25, 1974

Inventor(s) Cavit Akin

It is certified that error appears in the above-identified patent and that said Letters Patent are hereby corrected as shown below:

Column 6, line 8, "wells" should be -- cell walls --;
     line 51, "bifiunctional" should be -- bifunctional.

Column 8, line 9, "retension" should be -- retention --;
     line 15, "as syringe" should be -- a syringe --.

Column 10, line 6, "writtel" should be -- brittle --;
     line 60, "separated" should be -- spread --.

Column 11, line 11, "was" should be -- with --;
     line 40, "in n" should be -- in an --;
   lines 50-51, "protein-contining" should be -- protein-containing --;
     line 54, "concentartion" should be -- concentration --.

Column 12, line 4, "capabel" should be -- capable --.

Signed and sealed this 8th day of April 1975.

(SEAL)
Attest:

RUTH C. MASON
Attesting Officer

C. MARSHALL DANN
Commissioner of Patents
and Trademarks